US008180365B2

(12) United States Patent
Toone

(10) Patent No.: US 8,180,365 B2
(45) Date of Patent: May 15, 2012

(54) METHOD AND APPARATUS FOR IDENTIFYING A GEOGRAPHIC AREA HAVING UNDESIRABLE WIRELESS SERVICE

(75) Inventor: John D. Toone, Cary, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1086 days.

(21) Appl. No.: 11/295,797

(22) Filed: Dec. 7, 2005

(65) Prior Publication Data

US 2007/0129086 A1    Jun. 7, 2007

(51) Int. Cl.
*H04W 24/00* (2009.01)
*H04W 4/00* (2009.01)
*H04W 40/00* (2009.01)

(52) U.S. Cl. ............... 455/456.1; 455/422.1; 455/446

(58) Field of Classification Search ........ 455/423–425, 455/446, 453, 524, 561, 456.1–456.6, 67.11–67.14, 455/422.1
See application file for complete search history.

(56) References Cited

U.S. PATENT DOCUMENTS

| | | | |
|---|---|---|---|
| 5,398,276 A | | 3/1995 | Lemke et al. |
| 5,987,306 A * | | 11/1999 | Nilsen et al. ............... 455/67.11 |
| 6,223,042 B1 | | 4/2001 | Raffel |
| 6,266,514 B1 * | 7/2001 | O'Donnell ............... 455/67.13 |
| 6,336,035 B1 | 1/2002 | Somoza et al. |
| 6,625,541 B1 | 9/2003 | Shenoy et al. |
| 7,076,245 B1 * | 7/2006 | Satapathy ............... 455/421 |
| 7,136,636 B1 * | 11/2006 | McLaughlin ............... 455/423 |
| 7,206,573 B1 * | 4/2007 | Weaver et al. ............... 455/423 |
| 7,292,849 B2 * | 11/2007 | Merritt ............... 455/421 |
| 7,353,019 B2 * | 4/2008 | Martin ............... 455/424 |
| 7,400,884 B2 * | 7/2008 | Fok et al. ............... 455/414.2 |
| 2002/0198002 A1 * | 12/2002 | Ghandeharizadeh et al. 455/456 |
| 2003/0013441 A1 * | 1/2003 | Bhogal et al. ............... 455/423 |
| 2004/0013250 A1 * | 1/2004 | Kotnur et al. ............... 379/112.01 |
| 2004/0087305 A1 | 5/2004 | Jiang et al. |
| 2004/0176109 A1 * | 9/2004 | Niemenmaa ............... 455/456.5 |
| 2005/0064844 A1 * | 3/2005 | McAvoy et al. ............... 455/405 |
| 2005/0136911 A1 * | 6/2005 | Csapo et al. ............... 455/423 |
| 2005/0261003 A1 * | 11/2005 | Fiedler et al. ............... 455/456.1 |
| 2006/0079222 A1 * | 4/2006 | Martin ............... 455/423 |
| 2007/0004378 A1 * | 1/2007 | Muhonen ............... 455/404.2 |

FOREIGN PATENT DOCUMENTS

| | | | |
|---|---|---|---|
| EP | 1 120 983 A1 * | 1/2001 |
| EP | 1 120 983 B1 * | 1/2001 |
| EP | 1120983 A1 * | 8/2001 |
| EP | 1284579 A1 * | 2/2003 |

* cited by examiner

*Primary Examiner* — Brandon Miller

(57) ABSTRACT

A method and apparatus for identifying a geographic area having undesirable wireless service is described. The method includes, collecting Radio frequency (RF) environment information of the wireless service. The method further includes, determining locations of a plurality of subscriber units based on the RF environment information. Further, the method includes, processing the RF environment information and the locations of the plurality of subscriber units to identify the geographic area having the undesirable wireless service.

12 Claims, 8 Drawing Sheets

METHOD AND APPARATUS FOR IDENTIFYING A GEOGRAPHIC AREA HAVING UNDESIRABLE WIRELESS SERVICE

FIELD OF THE INVENTION

The present invention relates generally to the field of wireless networks, and more specifically, to a method for identifying a geographic area having undesirable wireless service.

BACKGROUND OF THE INVENTION

The evolution of wireless communication technology has created a reliance on mobile electronic devices. These mobile electronic devices are connected to transceiver systems, such as a Base Transceiver Station (BTS), to form a wireless network. The wireless network uses Radio Frequency (RF) signals for communication between a BTS and a mobile electronic device. Such a wireless network is divided into multiple cells, which are geographical areas covered by one or more BTSs. Each of these cells receives different wireless coverage, depending on strength of the RF signals, and the location of the mobile electronic device relative to the BTS.

The strength of RF signals in a cell is governed by factors such as the terrain and infrastructure at the geographic area, the environment of surrounding cells, etc. For example, there is a significant loss in the strength of RF signals when a user is in a low mobility area, such as, a building, a subway, and so forth. Such areas have low user movement. Such geographic areas therefore represent low mobility areas that have undesirable wireless service. The loss in the strength of the RF signals results in call failures, i.e., calls established between the mobile electronic device and the BTS is dropped. Such call failures are more predominant in the low mobility areas due to inadequate strength of the RF signals. Therefore, there is a need to identify such low mobility areas.

A known method for identifying low mobility areas uses a portable signal analyzer to detect the strength of RF signals in a real time environment. The signal analyzer is used as a backpack kit carried on a person's back. The signal analyzer has an arm held computing device that displays relevant information in real time and records the same. The person carrying the signal analyzer moves through a geographic area under consideration and collects the relevant information. However, the method is cumbersome and not feasible since the person has to traverse all the locations to be analyzed.

In another method, a software tool is used for wireless system planning, testing and determining low mobility areas. The software tool is fitted into a vehicle or any other means of transportation, and traversed through a geographical area under consideration. The tool helps in obtaining and analyzing information (in a real time environment) corresponding to various RF metrics, such as RF signal strength, distance between the mobile electronic device and the location of various BTS in the geographic area under consideration, and so forth. The information collected is used to identify geographic areas with weak RF signals. However, the tool obtains the information only for a pre-defined path, within the geographic area, in which the tool is traversing. Moreover, manual assistance is required for driving through the pre-defined path to collect the information for further analysis.

BRIEF DESCRIPTION OF THE DRAWINGS

Various embodiments will hereinafter be described in conjunction with the appended drawings provided to illustrate and not to limit the invention, wherein like designations denote like elements, and in which.

Figure 1:
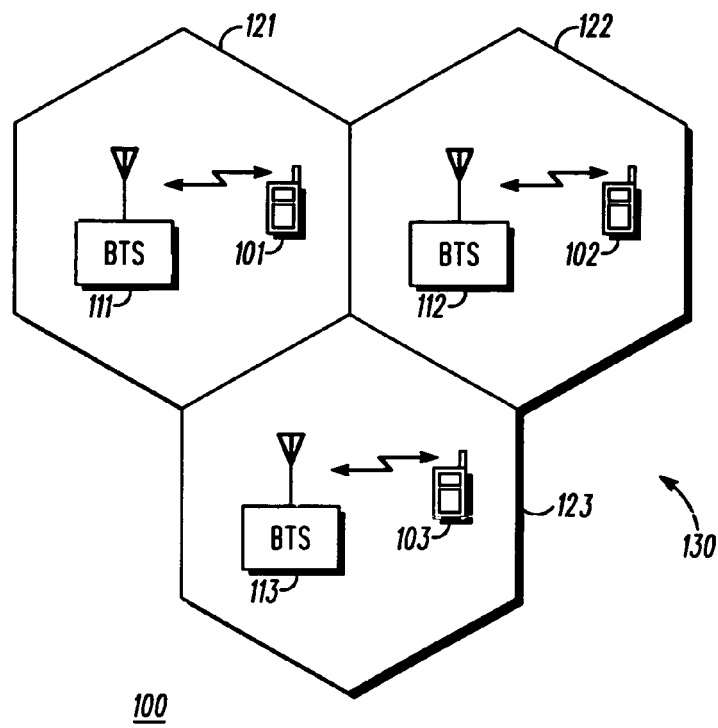
FIG. 1 illustrates an exemplary wireless communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE EMBODIMENTS

Before describing in detail the method for identifying a geographic area having undesirable wireless service, it should be observed that the present invention resides primarily in the method steps and apparatus components which are employed to identify a geographic area having undesirable wireless service.

Accordingly, the method steps and apparatus components have been represented where appropriate by conventional symbols in the drawings, showing only those specific details that are pertinent to understanding the present invention, so as not to obscure the disclosure with details that will be readily apparent to those of ordinary skill in the art having the benefit of the description herein.

Various embodiments of the present invention provide a method and a system for identifying a geographic area having undesirable wireless service. The method includes collection of Radio Frequency (RF) environment information. A location of each subscriber unit of a plurality of subscriber units is determined based on the RF environment information. Both the RF environment information and the locations of the plurality of subscriber units are then processed to identify the geographic area having undesirable wireless service.

FIG. 1 illustrates an exemplary wireless communication system 100 in accordance with an embodiment of the present invention. The system 100 includes a plurality of subscriber units 101-103 (three shown) that are each in wireless communication with one or more base transceiver stations (BTSs)

111-113 (three shown). In an exemplary embodiment of the present invention, each subscriber unit 101-103 may comprise a mobile phone. In various other embodiments of the present invention, each subscriber unit 101-103 may comprise a Personal Digital Assistant (PDA), a smart-phone, and so forth. Each BTS 111-113 provides wireless communication services to subscriber units, such as subscriber units 101-103, residing a respective coverage area 121-123 serviced by the BTS. Typically the plurality of BTSs are interconnected via one or more network elements, such as one or more base station controllers (BSCs), one or more mobile switching centers (MSCs), and/or other network elements known in the art. Together, the plurality of BTSs 111-113 and their interconnecting network elements (not shown) are referred to herein as a wireless network. As is known in the art, the wireless network may further include other network elements, such as a home location register (HLR), a visited location register (VLR), and authentication and billing servers that are not depicted herein for the purpose of not obscuring the disclosure with details that will be readily apparent to those of ordinary skill.

The wireless network provides wireless communication services to subscriber units residing in a geographic area 130 serviced by the network. Each subscriber unit 101-103 receives radio frequency (RF) signals of varying strengths depending on environmental conditions, such as, but not limited to, terrain, improvements, and the type of the geographic area serviced by the wireless network.

Figure 2:
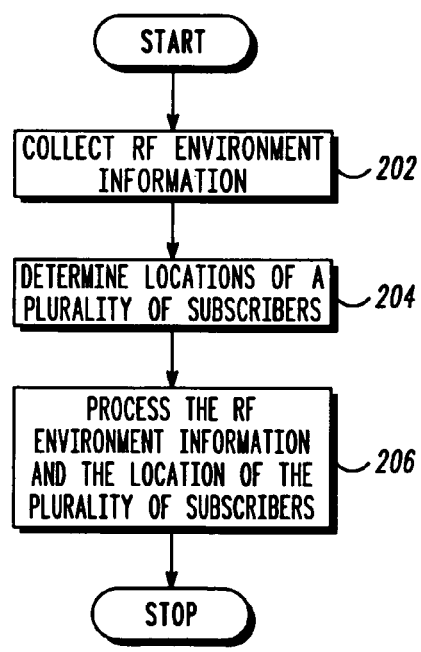
FIG. 2 is a logic flow diagram illustrating a method for identifying a geographic area having undesirable wireless service in accordance with an embodiment of the present invention.

FIG. 2 is a logic flow diagram illustrating a method for identifying a portion of the geographic area serviced by the wireless network and having undesirable wireless service in accordance with an embodiment of the present invention. RF environment information is collected for each subscriber unit of the plurality of subscriber units 101-103 at step 202. The RF environment information includes call detail logs (CDL), information concerning a BTS serving the subscriber unit at an origination and a termination of each call, call finalization class (CFC) information, pilot strength measurement message (PSMM) information, propagation time of flight information, differential time of flight information, and so forth. For each call, the RF environment information includes further details about the call, such as whether the call was completed, whether the call was dropped, and a duration of the call. At step 204, a location of each subscriber unit of the plurality of subscriber units is determined with respect to one or more calls associated with the subscriber unit and based on the RF environment information. For example, typically a location of each BTS, such as BTSs 111-113, of a network is maintained by the network in a managed information base (MIB). Based on the known location of a BTS and on the call information received from the BTS, a location of a subscriber unit served by the BTS may be determined. The determined location(s) of each subscriber unit is then associated with the RF environment information associated with the corresponding call that is collected at step 202. At step 206, the RF environment information and the locations of the plurality of subscriber units are processed to identify the geographic area with undesirable wireless service.

Figure 3:
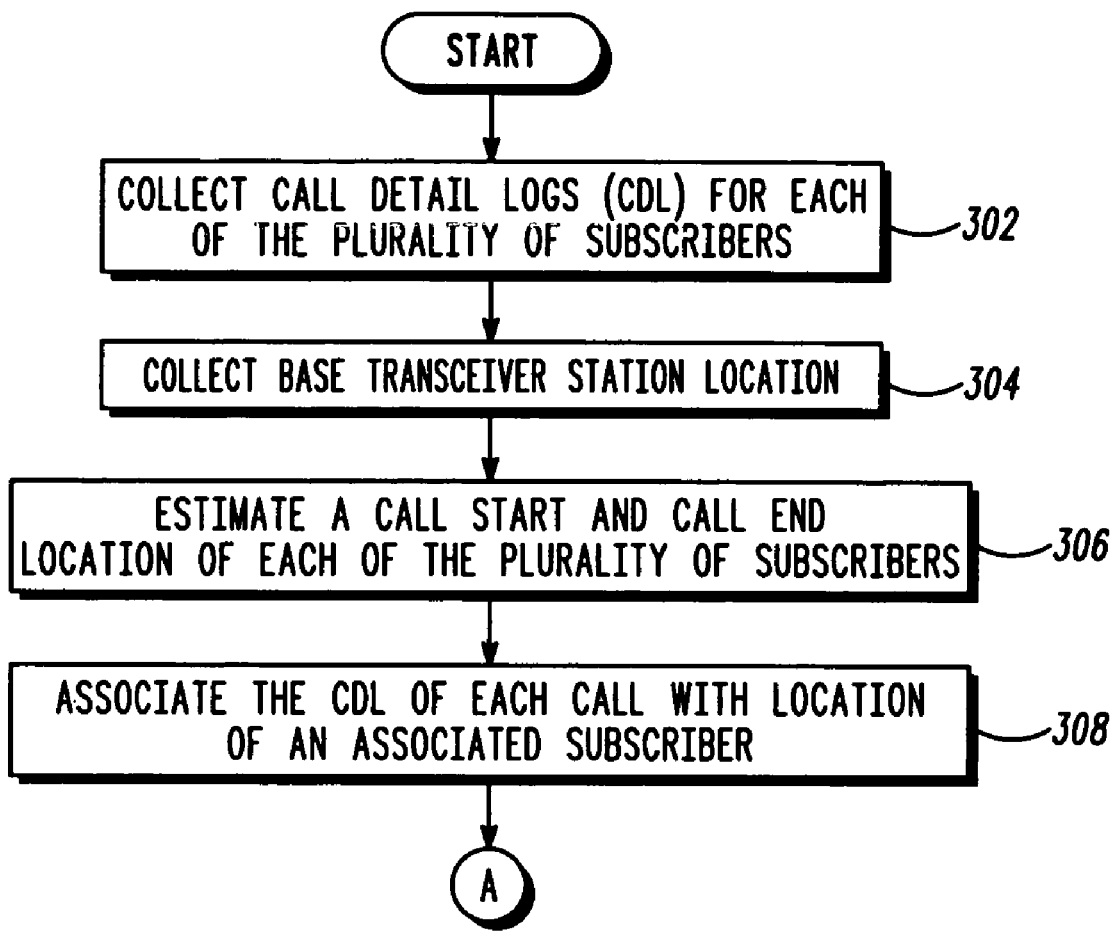
FIGS. 3 and 4 depict a logic flow diagram illustrating a method for identifying a geographic area having undesirable wireless service in accordance with another embodiment of the present invention.
Figure 4:
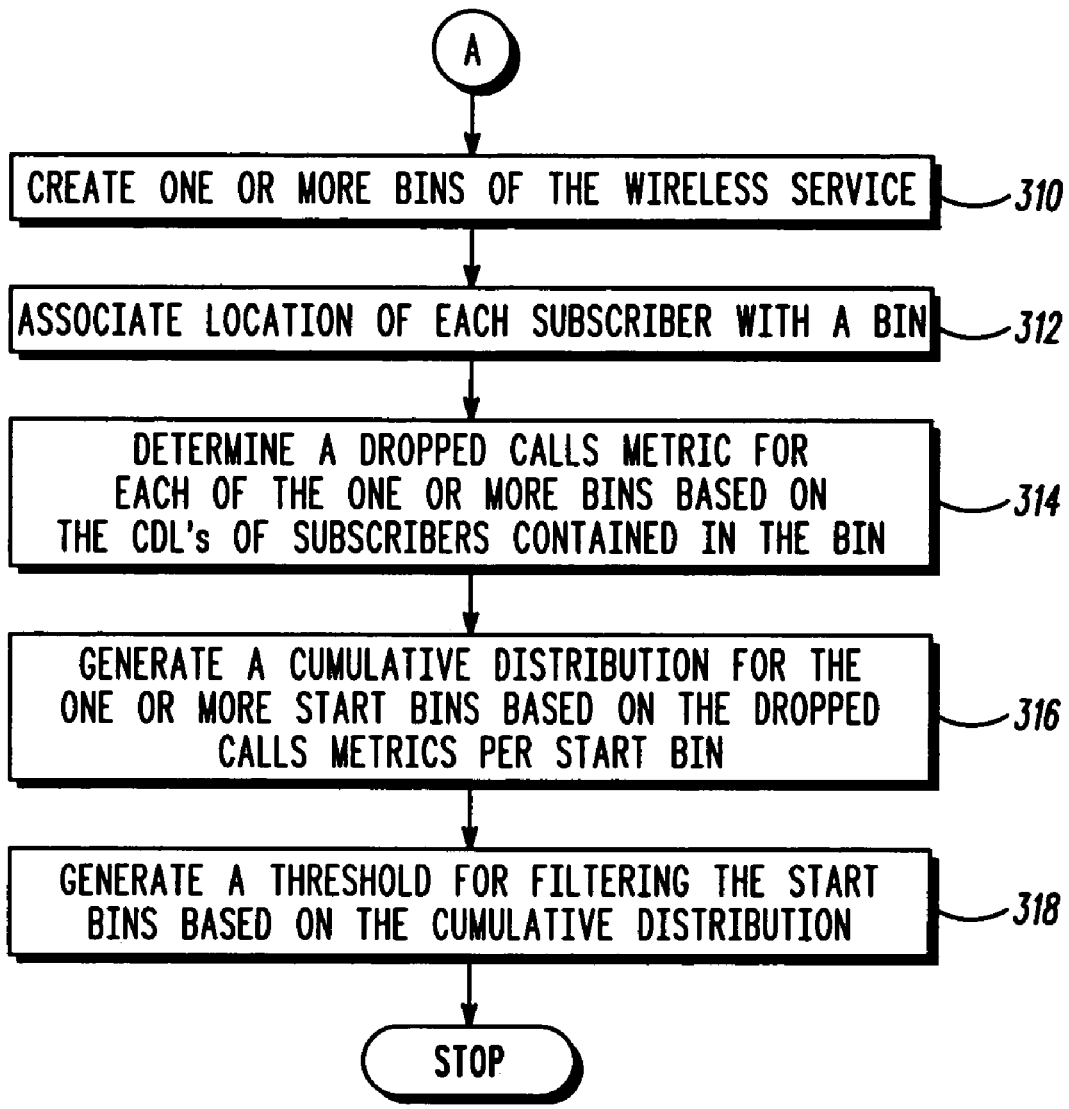

FIGS. 3 and 4 depict a logic flow diagram illustrating a method for identifying a portion of the geographic area serviced by the wireless network having undesirable wireless service in accordance with another embodiment of the present invention. At step 302, the CDL for each of the plurality of subscriber units 101-103 is collected. The CDL is associated with each call of a subscriber unit and includes multiple fields, such as propagation time of flight information, differential time of flight information, call finalization class (CFC) information, Pilot Strength Measurement Message (PSMM) information, and RF performance metrics. The RF performance metrics include a dropped calls metric, an access failures metric, a first best Ec/Io metric, a second best Ec/Io metric, a third best Ec/Io metric, a forward link frame error rate (FER) metric, a reverse link FER metric, a reverse link noise metric, a forward link Ec/Io metric, a forward link data rate metric, and a reverse link data rate metric. The CFC information describes the way in which the call ended, including information on whether the call ended normally, was dropped in progress, or failed to access the system.

A CDL associated with a subscriber unit 101-103 can be used to estimate the location of the subscriber unit in a geographic area, such as the geographic area serviced by network 100. The location may be determined by using one of a time difference of arrival (TDOA) technique and a time of arrival (TOA) technique. The TDOA technique is based on one or more of a propagation time of flight measurement and a differential time of flight measurement included in the CDL. The propagation time of flight and the differential time of flight information are extracted from the CDL for use in the TDOA technique. Further, the CFC information and the RF performance metrics are also extracted from the CDL. The TDOA technique analyzes the difference in apparent arrival time of signals from at least three BTS, taken two at a time. Based on the arrival times, a location of each subscriber unit 101-103 at a time of each call may then be calculated.

At step 304, the location information of at least one BTS is collected from the managed information base (MIB). In an embodiment of the present invention, the location information of three BTSs is obtained in order to use the TDOA technique. At step 306, a location of each subscriber unit of the plurality of subscriber units 101-103 is estimated at the start of a call involving the subscriber unit. Further, a location of each subscriber unit of the plurality of subscriber units 101-103 is estimated at the end of a call involving the subscriber unit. The location of each subscriber unit of the plurality of subscriber units 101-103 is estimated from the PSMM information and the CDL information collected at step 302. At step 308, for each subscriber unit and each call involving the subscriber unit, the CDL information is associated with the location of the subscriber unit, i.e., the location of the subscriber unit at the start of the call and the location of the subscriber unit at the end of the call. In an embodiment of the present invention, for each call, the CFC information and RF performance metrics associated with the call are also associated with the determined subscriber unit locations. At step 310, the geographic area serviced by the network is divided into one or more smaller geographic areas, referred to herein as bins. Each bin includes at least two subscriber units. The bins generated in a geographic area are further explained below.

At step 312, for each call, a location of the subscriber unit involved in the call is associated with a bin from the one or more bins. For example, a location of the subscriber unit at the start of a call may be associated with a bin. Similarly, a location of the subscriber unit at the end of the call may be associated with a same or a different bin. When a bin is associated with a location of a subscriber unit involved in a call, the bin is further associated with the RF performance metrics of the call.

At step 314, a dropped call metric is determined for each bin based on the CDL information. The dropped call metric is determined from the RF performance metrics, which are extracted from the CDL at step 302. The dropped call metrics represent relevant RF information when a call for a subscriber unit is dropped. The dropped call metrics per bin include the count and rate of subscriber units contained in the bin whose call ended as a drop while in progress.

At step 316, a cumulative distribution, based on the dropped call metric across all start bins, is generated. At step 318, a threshold for filtering the bins is generated based on the cumulative distribution generated at step 316. The threshold is then used to filter one or more of the start bins, thereby generating a subset of bins that correspond to a low mobility region with undesirable wireless service within the geographic area serviced by the network. In one embodiment of the present invention, the threshold is generated based on the number of dropped calls per bin, using the CFC information extracted from the RF environment information. In another embodiment of the present invention, the threshold is generated based on the drop call rate of a bin, i.e., the percentage of calls that are dropped out of the total established calls. In either case, with respect to each call, a subscriber unit is assigned to a bin based on the starting location of the subscriber unit as opposed to the ending location of the subscriber unit. The subset of bins is then plotted on a map (the locating of the call being according to the beginning location of the subscriber unit associated with the call). The end status of each plotted call may be further indicated in the map. Thus, a geographic area having undesirable wireless service is identified and the plurality of subscriber units within the undesirable wireless service are classified as low mobility subscriber units. The representation of the subset of bins on the map classifies the plurality of subscriber units in the subset of bins as low mobility subscriber units with undesirable wireless service, i.e., subscriber units present in a low mobility area where wireless service conditions in the area are such that many calls drop while in progress.

Figure 5:
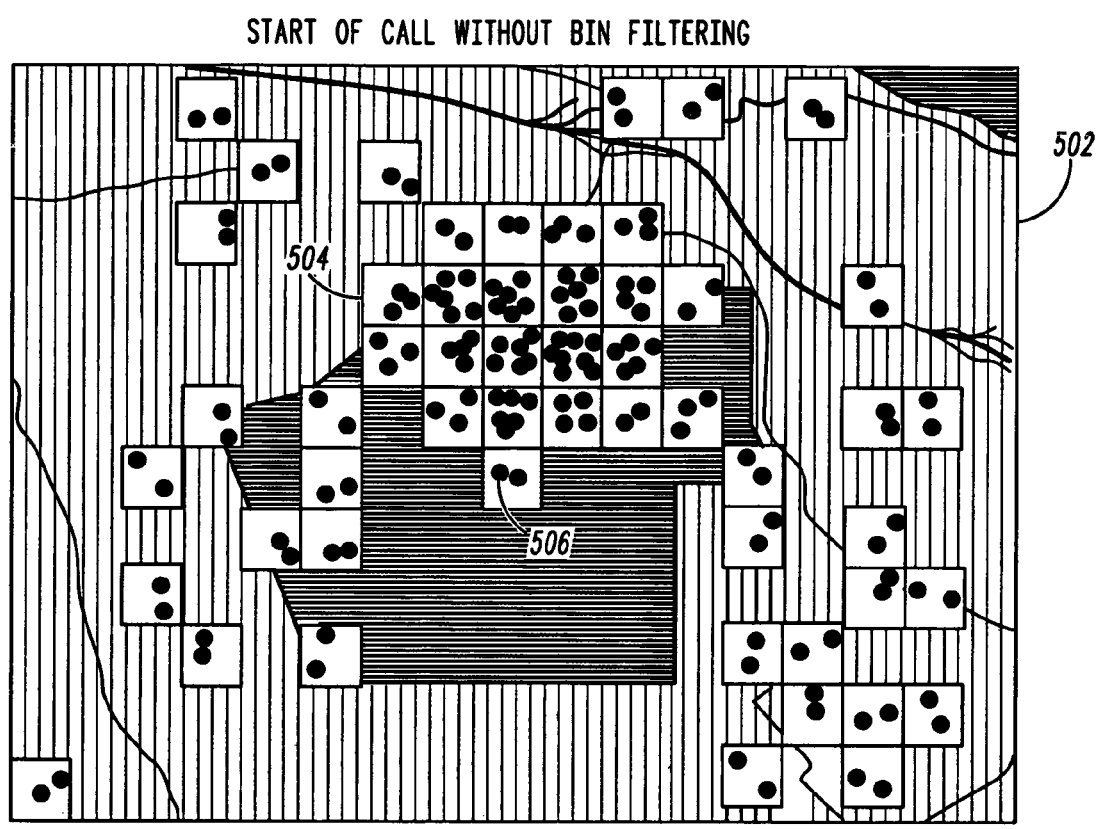
FIG. 5 is an exemplary mapping of a part of a geographic area comprised of bins associated with a start of a call and with no filter applied in accordance with an embodiment of the present invention.

FIG. 5 is an exemplary mapping of a part of a geographic area comprising bins associated with the start of a call in accordance with an embodiment of the present invention. No bin filtering has been applied in FIG. 5. The geographic area 502 contains a plurality of bins 504, each bin containing two or more of subscriber units 506. Subscriber units 506 all had their calls dropped while in progress. The bins 504 are associated with the location of the plurality of subscriber units 506 at the start of a call. The location of each of the plurality of subscriber units 506 at the start of the call is estimated based on the PSMM information in the CDL and is further indicated on the map.

Figure 6:
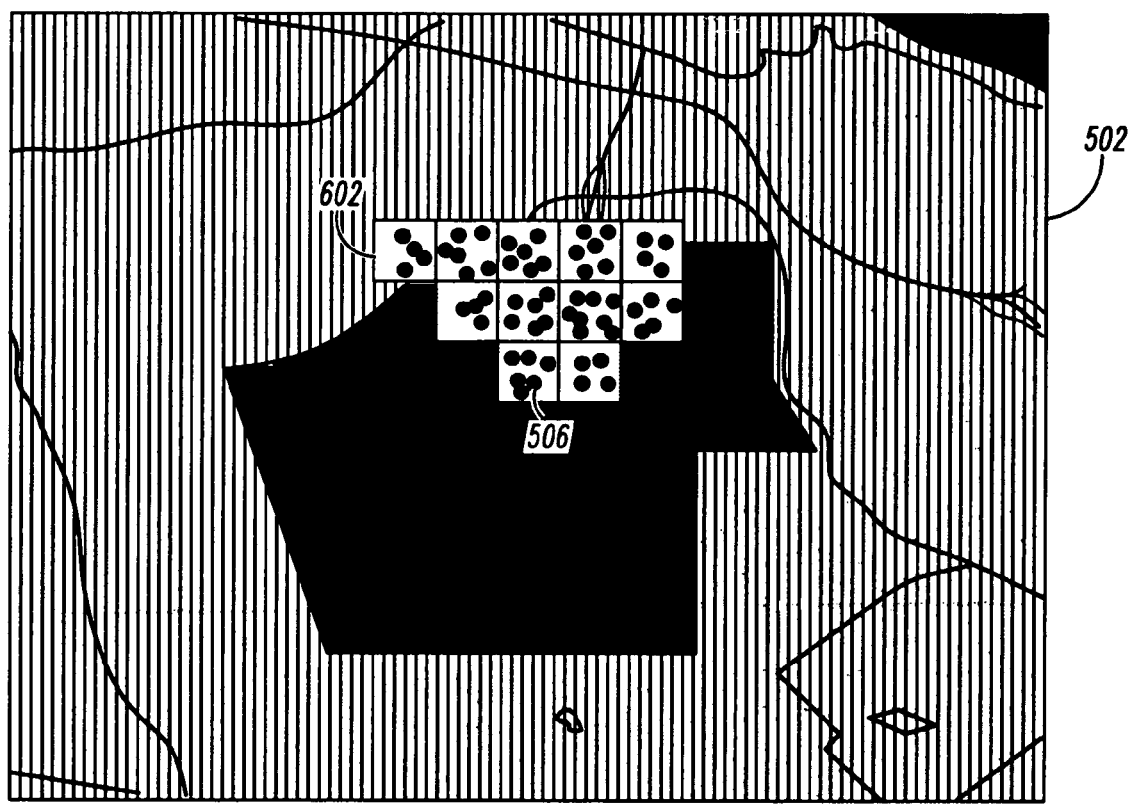
FIG. 6 is an exemplary mapping of a part of a geographic area comprised of bins associated with the start of a call and with the DropCount greater than or equal to 4 filter applied in accordance with an embodiment of the present invention.

FIG. 6 is an exemplary mapping of a geographic area comprised of bins associated with the start of a call in accordance with an embodiment of the present invention, wherein a bin filter defined as DropCount greater than or equal to (>=)4 has been applied. The geographic area 502 contains a plurality of bins 602 each bin containing four or more subscriber units 506 since the DropCount>=4 filter is applied. Subscriber units 506 all had their calls dropped while in progress. The bins 602 are associated with the location of the plurality of subscriber units 506 at the start of the call. The location of each the plurality of subscriber units 506 at the start of the call is calculated from the PSMM information in the CDL. In an embodiment of the present invention, the location of the plurality of subscriber units 506 at the start of the call is calculated from the CFC information in the CDL and is further indicated on the map.

In an embodiment of the present invention, each bin 602 is classified as a low mobility bin with undesirable wireless service.

In another embodiment of the present invention, a filter may be generated based on one or more fields in the bin RF performance metrics. The filters are generated to represent distinctly a geographic area having undesirable wireless service. For example, a filter may be based on an Average Best Ec/Io metric (Ec/Io being a ratio of the average power of an RF channel, typically a pilot channel, to the total signal power). The bin Average Best Ec/Io metric is computed as the average value of the subscriber Best Ec/Io metrics for the plurality of subscribers contained in the bin. The filter then comprises threshold values associated with the bin RF performance metric. For example, a filter that is based on the Average Best Ec/Io metric may comprise a threshold value between a numerical value of zero (corresponding to 0 dB) and a numerical value of '−20' (corresponding to −20 dB). It may be apparent to a person ordinarily skilled in the art that for RF communication to exist between a subscriber unit and a BTS, the threshold value for Ec/Io should not be less than the numerical value of approximately −16 dB. Any value below approximately −16 dB degrades the signal quality of the communication link.

In yet another embodiment of the present invention, a filter may be based on a bin Average Forward Link Frame Error Rate (FER) metric. The bin Average Forward Link Frame Error Rate metric is computed as the average value of the subscriber Forward Link Frame Error Rate metrics for the plurality of subscribers contained in the bin. The filter then comprises a threshold value associated with the corresponding bin RF performance metric. For example, the filter may comprise a threshold value between a numerical value 0% and a numerical value 10%. However, one may note that any value greater than a numerical value of approximately 5% degrades the signal quality of the communication link between a mobile electronic device and a BTS. The one or more generated filter thresholds are then applied to the one or more bins to produce a subset of bins. This subset of bins clearly identifies geographic locations on the map of areas with undesirable wireless system performance.

In still another embodiment of the present invention, one or more filters may be used together to generate a composite filter, which is then applied to the one or more bins to generate a subset of bins. For example, the filter using the bin Average Best Ec/Io metric and the filter using the bin Average Forward Link FER metric may be combined to generate a composite filter, which composite filter accounts for both Ec/Io and Forward Link FER thresholds in the generated subset of bins. Thereafter, the subset of bins are determined based on the application of the composite filter. In response to determining the subset of bins, the subset of bins are then plotted on a map of the geographic area. The application of the filters to the geographic area presents a clear view of the plurality of bins in the regions with poor wireless performance.

Figure 7:
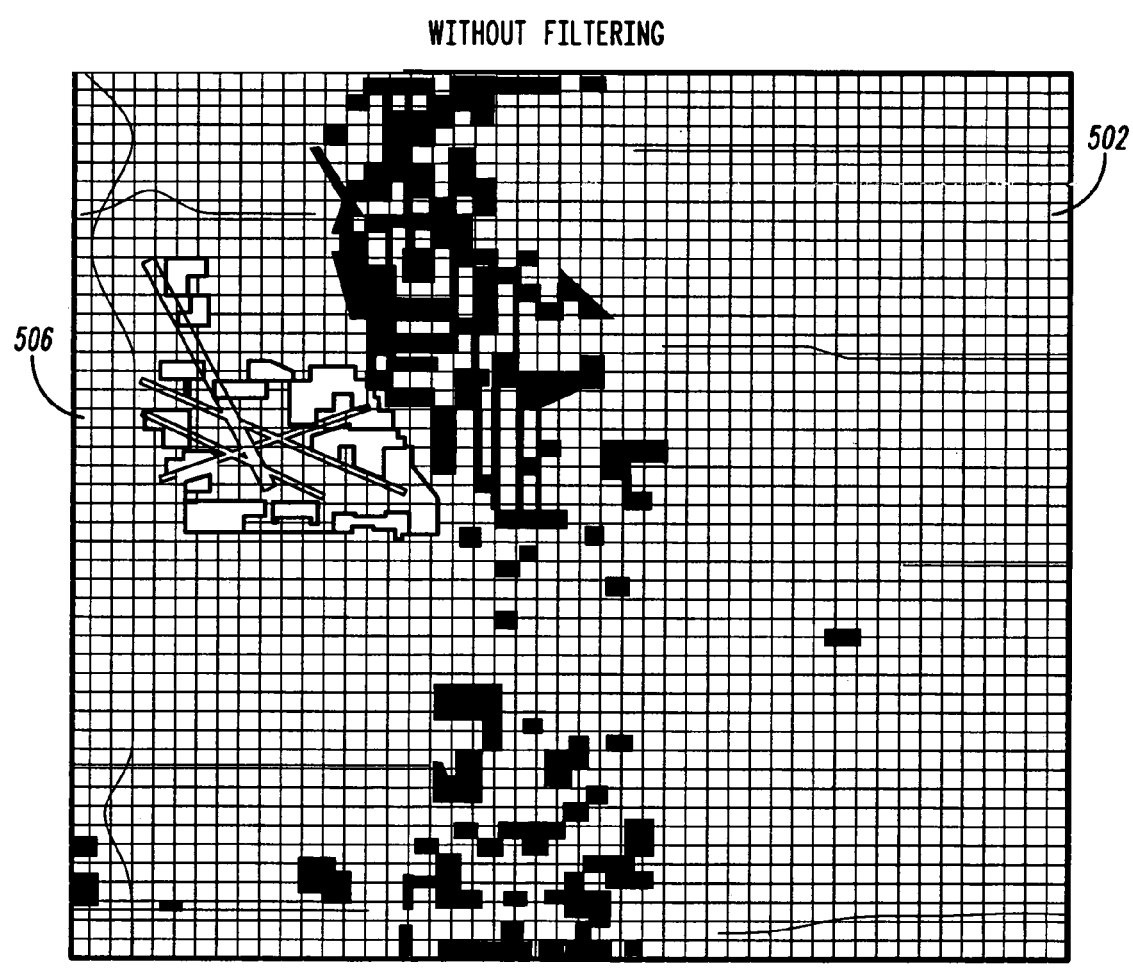
FIG. 7 is an exemplary mapping of a geographic area without the application of a composite filter in accordance with an embodiment of the present invention.

FIG. 7 is an exemplary mapping of the geographic area 502 without application of a composite filter to the one or more bins in accordance with an embodiment of the present invention. Without applying a filter, the composite filter in this instance, it becomes difficult to analyze the data corresponding to the plurality of bins 506. The dispersion of the bins 506 throughout the geographic area 502 is caused by the low accuracy of the time of flight and differential time of flight information used as input to the TOA and TDOA subscriber location algorithms. It is this dispersion of subscriber locations and associated bin locations that causes the map display to become difficult to analyze and where the present invention offers advancement over prior art to produce a clear display on the map.

Figure 8:
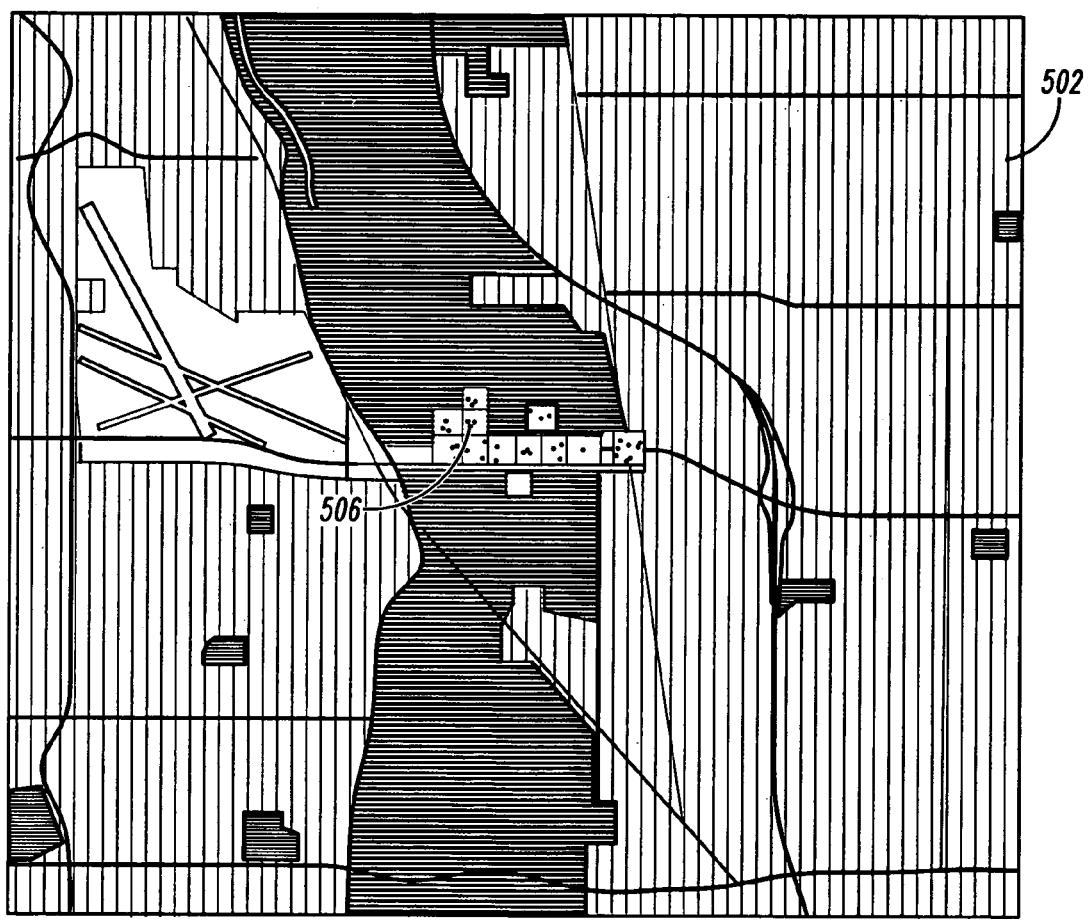
FIG. 8 is an exemplary mapping of a geographic area after the application of a composite filter in accordance with an embodiment of the present invention.

FIG. 8 is an exemplary mapping of the geographic area 502 after the application of a composite filter to the one or more bins in accordance with an embodiment of the present invention. The geographic area 502 contains a plurality of subscriber units 506 contained in a plurality of bins 802, which bins are mapped after the application of the composite filter to the one or more bins. For example, if the composite filter with bin Average Best Ec/Io and bin Average Forward Link FER as parameters in the RF performance metrics is applied to the bins, a subset of bins, such as bins 802, is generated as output. The bins 802 clearly identify the geographic location where a plurality of subscriber units 506 are experiencing a weak Ec/Io and a high Forward Link FER.

Figure 9:
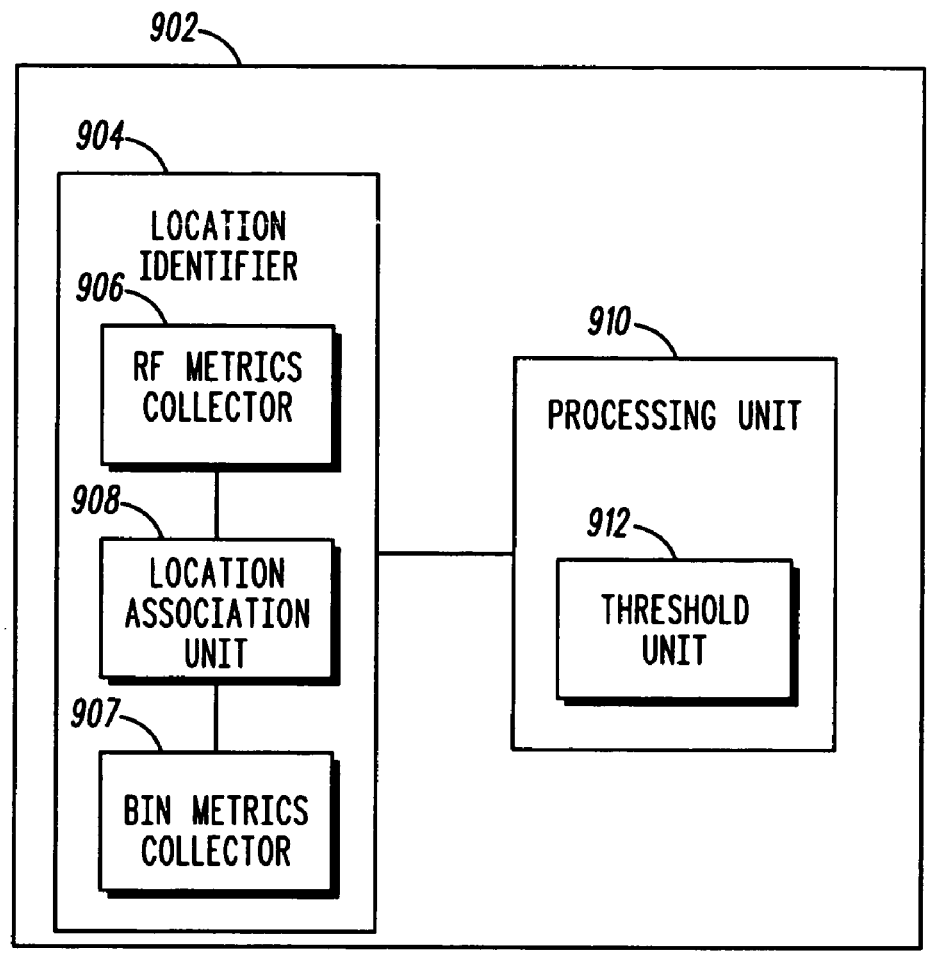
FIG. 9 is a block diagram of an apparatus for identifying a geographic area having undesirable wireless service in accordance with an embodiment of the present invention.

FIG. 9 is a block diagram of an apparatus 902 for identifying a geographic area having undesirable wireless service in accordance with an embodiment of the present invention. The apparatus 902 includes a location identifier 904 and a processing unit 910. The location identifier 904 includes an RF metrics collector 906, a bin metrics collector 907, and a location association unit 908. The RF metrics collector 906 collects RF environment information for each of the plurality of subscriber units. Based on the RF environment information, the location association unit 908 associates the location of each of the plurality of subscriber units with the RF environment information. For example, the location identifier 904 identifies the locations of each subscriber unit at the start of a call and at the end of the call. The start of call information and end of call information is extracted from the CDL, which is extracted from the RF environment information. The bin metrics collector 907 partitions the geographic area into bins and computes bin RF environment metrics by aggregating the RF environment information of each subscriber unit contained in a given bin. The identified bin location information and bin RF environment metrics are sent to the processing unit 910. The processing unit 910 further comprises a threshold unit 912 for determining a threshold based on the bin RF environment metrics. The locations of the plurality of bins are then filtered based on the threshold to generate a subset of bins that satisfy the threshold condition.

The embodiments of the present invention preferably are implemented within apparatus 902, and more particularly with or in software programs and instructions stored in at least one memory device (not shown) of the apparatus and executed by location identifier 904 and processing unit 910. However, one of ordinary skill in the art realizes that the embodiments of the present invention alternatively may be implemented in hardware, for example, integrated circuits (ICs), application specific integrated circuits (ASICs), and the like, such as ASICs implemented in one or more of location identifier 904 and processing unit 910. Based on the present disclosure, one skilled in the art will be readily capable of producing and implementing such software and/or hardware without undo experimentation.

As described above, the present invention provides a method and a system for identifying a geographic area having undesirable wireless service. The method uses the existing RF environment information for identifying a geographic area having undesirable wireless service. The method eliminates the need for manual intervention at the geographic area under analysis. In other words, a person need not be physically present at the geographic area for implementing the method. The method also facilitates the representation of the low mobility area as it clearly demarcates the same from the geographic area by using the bins to represent the plurality of subscriber units in the low mobility area.

In this document, relational terms such as first and second, and so forth may be used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The terms "including" and/or "having", as used herein, are defined as comprising. The term "coupled" as used herein is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for identifying a geographic area having undesirable wireless service, the method comprising: collecting call detail logs (CDL) of each call for each of a plurality of subscriber units; collecting location information for at least one base transceiver station (BTS); estimating a call start location of each subscriber unit of the plurality of subscriber units based on information included in the CDL; associating the CDL of each call with the call start location of an associated subscriber unit of the plurality of subscriber units; creating a plurality of bins, each bin of the plurality of bins being associated with a geographical area having two or more subscriber units; associating the call start location of each subscriber unit of the plurality of subscriber units with a bin of the plurality of bins; determining one or more of a dropped calls metric for each bin of the plurality of bins based on the information included in the CDL's of the two or more subscriber units associated with the bin; generating a cumulative distribution across all bins associated with the call start location based on one or more of the dropped calls metrics; and generating a threshold for filtering the bins associated with the call start location based on the cumulative distribution.

2. The method of claim 1 further comprising:
extracting radio frequency performance metrics from the CDL.

3. The method of claim 2, wherein the radio frequency performance metrics comprise one or more of a dropped calls metric, an access failures metric, a best Ec/Io metric, a second best Ec/Io metric, a third best Ec/Io metric, a forward link frame error rate metric, a reverse link frame error rate metric, a reverse link noise rise metric, a forward link Ec/Io metric, a forward link data rate metric, and reverse link data rate metric.

4. The method of claim 3 further comprises associating call finalization class and radio frequency performance metrics of each call with the location of the associated subscriber unit of the plurality of subscriber units.

5. The method of claim 1, further comprising estimating a call end location of each subscriber unit of the plurality of subscriber units.

6. The method of claim 1, further comprising classifying subscriber units of the plurality of subscriber units that are associated with the geographic area identified as having undesirable wireless service as low mobility subscriber units.

7. The method of claim 1, wherein determining one or more of a dropped calls metric for each bin of the plurality of bins based on the information included in the collected call detail logs (CDL) comprises determining one or more of a dropped calls metric for each bin of the plurality of bins based on call finalization class (CFC) information from the CDL's of the two or more subscriber units contained in the bin.

8. The method of claim 1, wherein the method further comprises:

filtering one or more bins of the bins associated with the call start location based on the threshold to produce a subset of the one or more bins; and mapping the subset of the one or more bins of the bins associated with the call start location.

9. The method of claim 8, further comprising:

generating one or more filters, wherein each filter of the one or more filters comprises the threshold; and applying the one or more filters to the plurality of bins to produce a subset of the plurality of bins.

10. The method of claim 9, further comprising:

combining a plurality of filters of the one or more filters to produce a composite filter; and displaying a bin of the plurality of bins on a map based on an application of the composite filter to the bin.

11. The method of claim 9, further comprising classifying subscriber units of the plurality of subscriber units that are associated with the subset of the plurality of bins as low mobility subscriber units.

12. The method of claim 1, wherein the call start location is estimated using one or more of a time difference of arrival technique and a time of arrival technique and based on one or more of a propagation time of flight measurement and a differential time of flight measurement of the CDL.

* * * * *